US010739962B1

(12) United States Patent
Pashintsev et al.

(10) Patent No.: US 10,739,962 B1
(45) Date of Patent: Aug. 11, 2020

(54) RESTORING FULL ONLINE DOCUMENTS FROM SCANNED PAPER FRAGMENTS

(71) Applicant: Evernote Corporation, Redwood City, CA (US)

(72) Inventors: Alexander Pashintsev, Cupertino, CA (US); Eugene Livshitz, San Mateo, CA (US); Vitaly Glazkov, Moscow (RU); P. J. Tanzillo, Austin, TX (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 15/241,510

(22) Filed: Aug. 19, 2016

Related U.S. Application Data

(60) Provisional application No. 62/209,046, filed on Aug. 24, 2015.

(51) Int. Cl.
| | |
|---|---|
| *G06F 3/0484* | (2013.01) |
| *H04N 5/225* | (2006.01) |
| *G06F 3/01* | (2006.01) |
| *G06F 40/166* | (2020.01) |

(52) U.S. Cl.
CPC .......... *G06F 3/04842* (2013.01); *G06F 3/017* (2013.01); *G06F 40/166* (2020.01); *H04N 5/225* (2013.01)

(58) Field of Classification Search
None
See application file for complete search history.

(56) References Cited

U.S. PATENT DOCUMENTS

| | | | | |
|---|---|---|---|---|
| 8,725,565 | B1* | 5/2014 | Ryan | G06Q 30/0269 705/14.4 |
| 9,681,016 | B2* | 6/2017 | Arputharaj | H04N 1/04 |
| 9,971,562 | B2* | 5/2018 | Park | G06K 9/00704 |
| 9,973,705 | B2* | 5/2018 | Ko | G06K 9/00677 |
| 2008/0098433 | A1* | 4/2008 | Hardacker | H04N 7/163 725/52 |
| 2009/0171907 | A1* | 7/2009 | Radovanovic | G06F 16/3326 |
| 2010/0325535 | A1* | 12/2010 | Reddy | G06F 17/24 715/246 |
| 2011/0153653 | A1* | 6/2011 | King | G06F 17/30253 707/769 |
| 2011/0194770 | A1* | 8/2011 | Kim | G06K 9/00456 382/176 |

(Continued)

*Primary Examiner* — Howard Cortes
(74) *Attorney, Agent, or Firm* — Morgan, Lewis & Bockius LLP

(57) ABSTRACT

Searching for documents includes retrieving objects from a physical media image using a camera from a smartphone, a user selecting a subset of the objects, forming a search query based on the subset of objects, and applying the search query to a search engine to search for the documents. Retrieving objects from a media image may include waiting for a view of the camera to stabilize. Waiting for the view of the camera to stabilize may include detecting changing content of a video flow provided to the camera and/or using motion sensors of the camera to detect movement. Retrieving objects may include the smartphone identifying possible subsets of objects in the media image. The user selecting a subset of the objects may include the smartphone presenting at least some of the possible subsets to the user and the user selecting one of the possible subsets.

20 Claims, 5 Drawing Sheets

(56) References Cited

U.S. PATENT DOCUMENTS

| | | | | |
|---|---|---|---|---|
| 2012/0041941 | A1* | 2/2012 | King | G06F 17/218 707/711 |
| 2012/0294520 | A1* | 11/2012 | Mei | G06K 9/00335 382/164 |
| 2013/0275849 | A1* | 10/2013 | King | G06K 9/228 715/229 |
| 2014/0050409 | A1* | 2/2014 | Constantinou | G06K 9/6202 382/195 |
| 2014/0111542 | A1* | 4/2014 | Wan | G06F 17/30253 345/633 |
| 2014/0111638 | A1* | 4/2014 | Isakov | H04N 5/23222 348/135 |
| 2014/0278346 | A1* | 9/2014 | Zomet | G06F 17/289 704/3 |
| 2015/0010235 | A1* | 1/2015 | Copsey | G06F 17/30253 382/182 |
| 2015/0095855 | A1* | 4/2015 | Bai | G06F 3/017 715/863 |
| 2015/0134323 | A1* | 5/2015 | Cuthbert | G06F 17/289 704/3 |
| 2015/0212695 | A1* | 7/2015 | Nordstrom | G06F 3/0482 715/256 |
| 2015/0318020 | A1* | 11/2015 | Pribula | H04N 21/43615 386/227 |
| 2015/0347389 | A1* | 12/2015 | Lee | G06F 17/289 704/2 |

\* cited by examiner

RESTORING FULL ONLINE DOCUMENTS FROM SCANNED PAPER FRAGMENTS

CROSS-REFERENCE TO RELATED APPLICATIONS

This application claims priority to U.S. Prov. App. No. 62/209,046, filed on Aug. 24, 2015, and entitled "RESTORING FULL ONLINE DOCUMENTS FROM SCANNED PAPER FRAGMENTS", which is incorporated herein by reference.

TECHNICAL FIELD

This application is directed to the field of image and information processing and online search, and more particularly to the field of identifying fragments of scanned paper copies of articles and retrieving full online copies of articles via Internet search based on fragment content.

BACKGROUND OF THE INVENTION

Mobile phones with digital cameras have become a pervasive type of mobile devices. Worldwide smartphone sales have surpassed one billion units for the first time in 2014. According to market forecasts, in 2014-2018, annual smartphone shipments are expected to grow from 1.28 to 1.87 billion units. Over 80% of all mobile phones will be arriving to customers with embedded digital cameras. Market research also indicates that photographing with phone cameras ranks first among the most popular activities of smartphone owners. According to recent polls, photographing with phone cameras was employed by 82% of users, exceeding even the previously most popular activity, texting, which was utilized by 80% of the owners. Other studies indicate that every year over a quarter of all photographs are taken with smartphones; the total count of images posted on social photo-sharing sites and taken with smartphones has exceeded the cumulative count of posted photographs taken with all other types and models of non-smartphone equipment.

Hundreds of millions smartphone users are daily employing smartphone cameras in their business offices and homes and are combining their digital habits with the conventional lifestyle where paper media retains its significant role in the everyday information flow of businesses and households. Pages from books and magazines, printed newspaper articles, receipts, invoices, checks, tax and other forms, printed reports, business cards, handwritten notes and memos on legal pads, in specialized Moleskine notebooks, on sticky notes or easels, and many other types of printed and handwritten documents are increasingly benefiting from digital capturing. Thus, a recent survey of smartphone usage by millennials has revealed that 68% of survey respondents have been introduced to mobile information capturing via mobile check deposits, while 83% share an opinion that mobile capture will be part of all mobile transactions within the next few years.

The role of digitizing and capturing of paper based information has increased with the arrival of unified multi-platform content management systems, such as the Evernote service and software developed by Evernote Corporation of Redwood City, Calif. Growing camera resolution, quality of photographs and feature sets of smartphone cameras allow users to capture scenes with rich content and multiple objects.

In recent years, many software applications for advanced real-time processing of photographs made with smartphone cameras have been developed. These applications may improve various aspects of image quality, fix perspective distortions, identify different types of objects in photographed scenes, etc. Combined with cloud services or working standalone, software applications may further recognize objects such as barcodes, text and faces and assign alpha-numeric values or names to objects. Progress has also been made in automatic scanning of paper documents using smartphone cameras. For example, Scannable software by Evernote Corporation may identify and automatically capture document pages in complex scenes with perspective and other types of image correction or retrieve content layout within document pages.

Notwithstanding significant progress in pre-processing, correction and recognition of scenes captured with smartphone cameras, interaction levels between the smartphone and the user in the photographing process remain insufficient. Users have limited capabilities to select a sub-scene or a set of dedicated objects from a complex scene, avoid capturing of unnecessary objects, etc. Additionally, when a fragment of a paper document is captured, users don't gain access to a full document, although on many occasions, an online copy of the full document exists.

Accordingly, it may be useful to develop efficient mechanisms for interacting with a user at the time of capturing photographs with smartphone cameras and for supplementing a captured document fragment with a full online copy thereof.

SUMMARY OF THE INVENTION

According to the system described herein, searching for documents includes retrieving objects from a physical media image using a camera from a smartphone, a user selecting a subset of the objects, forming a search query based on the subset of objects, and applying the search query to a search engine to search for the documents. Retrieving objects from a media image may include waiting for a view of the camera to stabilize. Waiting for the view of the camera to stabilize may include detecting changing content of a video flow provided to the camera and/or using motion sensors of the camera to detect movement. Retrieving objects may include the smartphone identifying possible subsets of objects in the media image. The user selecting a subset of the objects may include the smartphone presenting at least some of the possible subsets to the user and the user selecting one of the possible subsets. The user may reject some of the possible subsets by shaking the smartphone during presentation thereof. The user may select one of the possible subsets by tapping the smartphone during presentation thereof. The user may select one of the possible subsets by viewing the one of the possible subsets for a pre-determined amount of time without viewing other ones of the subsets. The search query may be formed from text identified in the subset of objects chosen by the user. Searching for documents may also include removing stopwords from the text identified in the subset of objects chosen by the user to provide a plurality of text fragments. The search query may be formed from the plurality of text fragments. Search results may be prioritized based on publication time, author credentials, and/or distribution chain.

According further to the system described herein, a non-transitory computer readable medium contains software that searches for documents. The software includes executable code that retrieves objects from a physical media image using a camera from a smartphone, executable code that facilitates a user selecting a subset of the objects, executable code that forms a search query based on the subset of objects, and executable code that applies the search query to a search engine to search for the documents. Retrieving objects from a media image may include waiting for a view of the camera to stabilize. Waiting for the view of the camera to stabilize may include detecting changing content of a video flow provided to the camera and/or using motion sensors of the camera to detect movement. Retrieving objects may include the smartphone identifying possible subsets of objects in the media image. The user selecting a subset of the objects may include the smartphone presenting at least some of the possible subsets to the user and the user selecting one of the possible subsets. The user may reject some of the possible subsets by shaking the smartphone during presentation thereof. The user may select one of the possible subsets by tapping the smartphone during presentation thereof. The user may select one of the possible subsets by viewing the one of the possible subsets for a pre-determined amount of time without viewing other ones of the subsets. The search query may be formed from text identified in the subset of objects chosen by the user. The software may also include executable code that removes stopwords from the text identified in the subset of objects chosen by the user to provide a plurality of text fragments. The search query may be formed from the plurality of text fragments. Search results may be prioritized based on publication time, author credentials, and/or distribution chain.

The proposed system monitors motion of a camera of a smartphone, processes video flow captured by the smartphone in a preview mode, analyzes scenes to detect preferred objects, assists a user in retrieving objects in a semi-automatic mode, analyzes text portion of a retrieved object, builds an online query, searches for full online copies of articles corresponding to an object, and uses timing, author and distribution criteria to choose a most adequate online source, which may be stored as a reference or as a full copy with the retrieved object.

System functioning includes several phases, as follows:

1. Retrieving Objects from a Camera Phone Photograph.

A user targets a piece of print media or a paper based document with a smartphone camera. The system analyzes camera position and movements, identifies and chooses—possibly, with user's assistance—one or more desired objects from the image, such as portions and sections of documents, print articles, columns within articles or pages of the media, etc. In order to facilitate user choice of target (desired) objects within a scene, the system may build a series of multi-object layouts and may subsequently present alternative layouts to the user, as explained in more details elsewhere herein.

2. Identifying and Recognizing Text within Objects.

A retrieved object may include text, images, drawings, charts and other components. The system may attempt restoring full online sources for objects with a sufficient text volume—for example, 20 or more words. The system may use known techniques for identifying text in raster objects and for converting text to machine printed formats using OCR or other text recognition methods. Subsequent steps in restoring full source of an object may be taken only if a sufficient amount of text has been identified and reliably recognized within the object.

3. Building Search Query.

Recognized text within an object may be used to build an extensive search query. First, stop words may be deleted from the text using a special vocabulary. Then, contiguous fragments of text between deletions may be formatted as exact search subqueries—for example, by putting the contiguous fragments in quote signs or using other conventions of a chosen search engine. Finally, the subqueries may be merged into a single exact query, which requires every sub-query to be satisfied in each answer.

4. Identifying and Optimizing Source Documents.

A search query built at the previous step may be submitted to a chosen general purpose or specialized search engine. Because of the significant query length and strict requirements on an exact order of words, it is possible that one of three search outcomes materializes: (i) a single online document is found; (ii) a set of syndicated or alias documents is found; (iii) no documents are found.

In the first case (i), the identified document is likely a unique online source for the object, such as an online copy of a full original non-syndicated article printed in a newspaper from which a fragment was extracted as the current object. In the second case (ii), documents may represent syndicated versions of an article, publications of document copies in different online repositories, etc. In the third case (iii), a print copy from which the object was extracted may be the only representation of the document or article, such as exclusive articles intended only for users of paid print publications that aren't reproduced in free or reduced price internet outlets of a publication.

Several additional steps may be helpful for selection of a single source document in the scenario (ii), as explained below. An additional check may be done to verify whether the whole body of text in the chosen object may be found, with possible insignificant variations, as a contiguous fragment of the source document; if so, the source may be presented to the user for approval. In both scenarios (i) and (ii), a web address of the identified source page may be stored with the object as a reference, or a full copy of the document, when possible and permitted, may be stored with the captured object.

Further details of the system workflow are listed below; some of the further details may be optional and depend, for example, on an outcome of scene analysis by the system:

When identifying an object from a camera video stream, a user may start targeting a scene by quickly moving a smartphone camera to a desired position during a pre-positioning phase. The system may identify frequent content changes during such preliminary camera movement and may abandon analysis of video flow during the pre-positioning phase.

Once the user has stabilized the camera and frequent changes in the video flow have subsided, the system may analyze the scenes within periodically refreshed frames of the video flow. For example, a close photo scan of a document, a set of documents, a newspaper or a magazine page arranged on a desk may focus on detecting document pages, recognizing document layout, separating text blocks from drawings and charts, etc.

Various heuristics, custom user preferences, specifics of scene layout and other considerations may be used for identification of preferred objects in a scene. Thus, in case of document capturing, a handwritten note positioned close to the center of a scene and shielding from view a portion of another document may be considered a preferred object. If a similar scene contains several handwritten notes (e.g. sticky pads with comments on top of a document), each note that is fully represented (not cut-off) in a frame may be considered a preferred object.

The system may identify multiple preferred objects and may build multi-object scenarios by grouping objects in the scene and sequentially presenting the groups for a choice by the user. For example, in a newspaper/magazine page scenario, an original scene may include a portion of the page with an article printed in three columns under a header spanning all columns, and the rest of the page content may be cut off. In such a case, the system may build a list of scenarios where the article, each of the columns of the article without a header or each pair of adjacent columns under a header form distinct scenarios. Another example for a real-life 3D scene may present a building, an individual standing next to the building, a tree near the building, any pairwise combination of the above, and all three objects together as distinct scenarios. Alternative scenarios may be presented, for example, as pictograms on the smartphone screen, where objects included in a current scenario are highlighted or object absent from a scenario are faded.

The user may approve or reject intermediate scenarios presented using timeouts, multi-touch or spatial gestures, such as shaking a smartphone, voice commands, etc. The user may also elect to re-target the camera to directly point to the desired choice via zoom-in.

In the event that the system has identified multiple online source documents (e.g., case (ii), above), online sources may be ordered by publication times, author(s) and primary affiliation of the sources, publications may be ordered by content distribution chains (for example, major news feeds such as Reuters and AP may precede articles in major newspapers, such as New York Times, which may stand closer to a root of content distribution than articles published by Internet aggregators, such as Yahoo! News). Based on the criteria such as publication time, author affiliation, and position in a distribution chain, multiple online documents in the query answer set may be ordered and a most authentic single source may be selected. In any event, user approval of the final source and/or additional verification of closeness between the source and the captured objects may be conducted.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for analyzing printed media and document pages targeted by a user smartphone, in a camera preview mode, assisting the user in semi-automatic retrieval of desired objects from the page, processing textual information in the retrieved objects and searching for full online copies of printed materials that may be stored as references with the captured objects.

Figure 1:
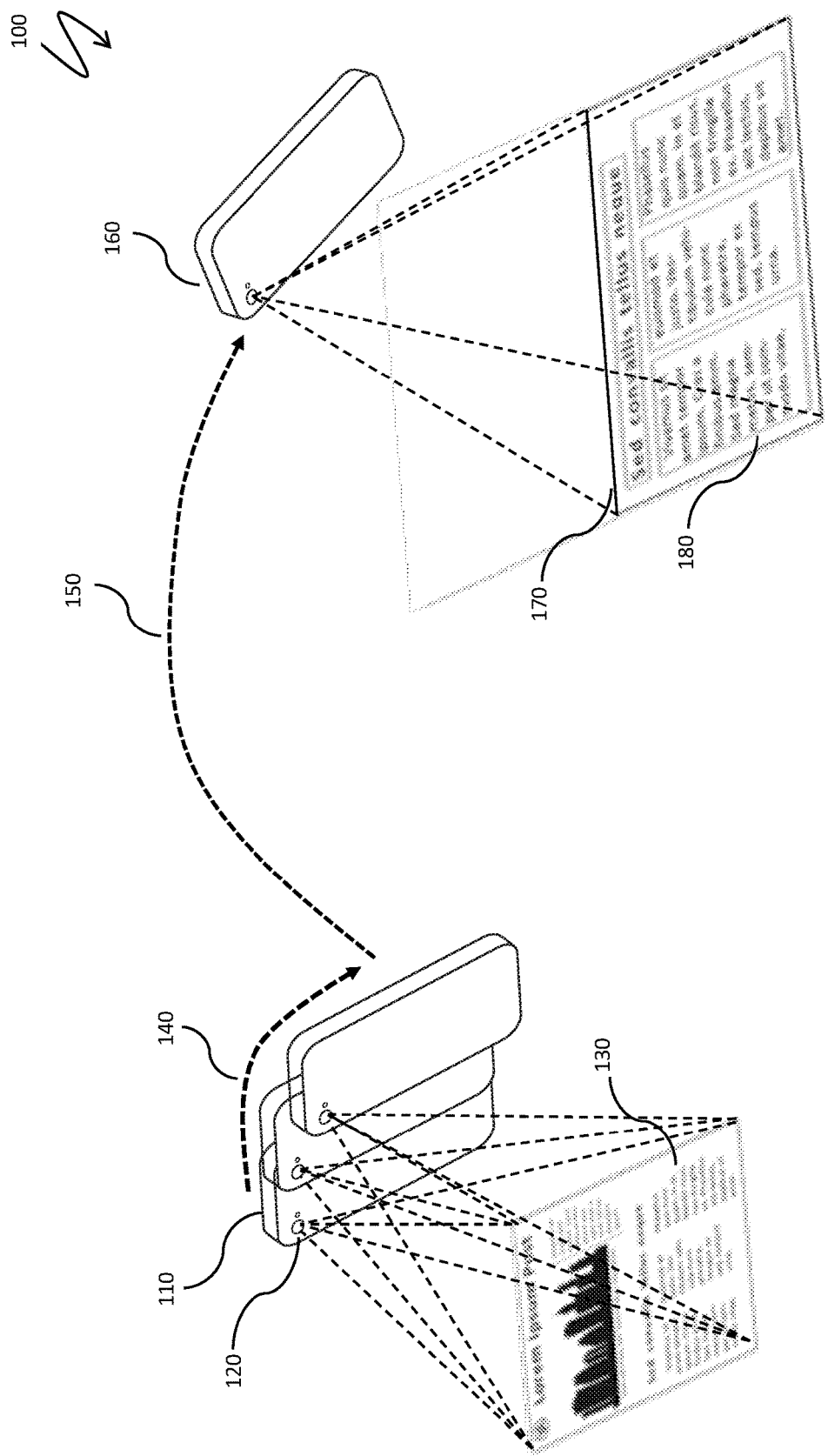
FIG. 1 is a schematic illustration of smartphone camera positioning and targeting during object retrieval, according to an embodiment of the system described herein.

FIG. 1 is a schematic illustration 100 of smartphone camera positioning and targeting during object retrieval. A smartphone 110 with a camera 120 is positioned by a user to retrieve objects from a printed media page 130. Initially, the user quickly moves the camera to get the right distance and angle with respect to the page for a quality camera view, as shown by an arrow 140 and explained elsewhere herein. During such pre-positioning, the system may identify quick movement and detect a frequent changing of content in the video flow via smartphone movement sensors and rough camera preview processing and may ignore the flow, so that the content is not permanently captured or analyzed and the system does not attempt retrieving objects from the page image, as explained elsewhere herein.

As the smartphone movement slows down and the user targets a full or a portion of the printed page, as illustrated by a trajectory 150, a camera position and view angle 160, and a page fragment 170, the system becomes capable of analyzing a relatively stable video flow in the camera preview mode and may start identifying objects 180 within the page fragment 170.

Figure 2:
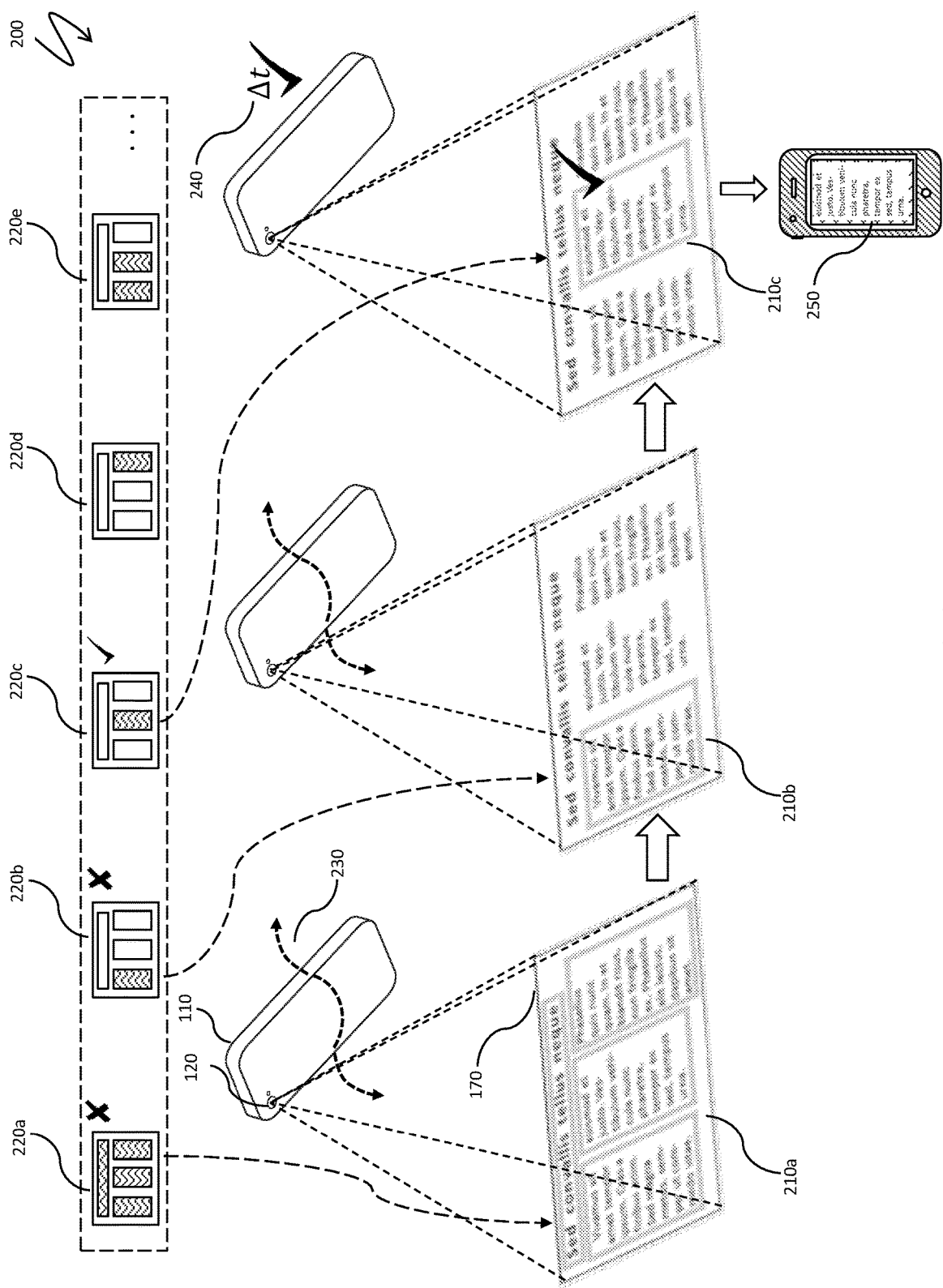
FIG. 2 is a schematic illustration of object retrieval in a multi-object scenario using rejection gestures and timeouts, according to an embodiment of the system described herein.

FIG. 2 is a schematic illustration 200 of object retrieval in a multi-object scenario using rejection gestures and timeouts. The smartphone 110 with the camera 120 is stabilized over the fragment 170. In the example of FIG. 2, the system identifies multiple objects, namely, columns and the header of an article reproduced in the fragment 170. In other examples, objects may be heterogeneous, for example, an article and a news announcement under different headers.

It is not immediately known to the system which object(s) the user is interested to choose and store. Accordingly, the system may build a series of scenarios combining the desired objects in various combinations, as illustrated by layouts 210a, 210b, 210c where each object included in a scenario is surrounded with a frame. Thus, the scenario 210a includes all objects in the fragment 170 (three columns and a header); the scenario 210b includes only the left column; and the scenario 210c includes only the middle column.

The system may build pictograms illustrating each scenario and display the pictograms one-by-one on a screen of the smartphone 110 for user choice. The system may also display a set of scenarios on the screen and allow the user choosing from among the scenarios by tapping or other gesture or by an alternative method, such as a voice command choosing a particular scenario. In FIG. 2, three pictograms 220a, 220b, 220c correspond to the three scenarios 210a, 210b, 210c explained above, while two additional pictograms 220d, 220e show further progression of scenarios and object layouts in the event no choice have been made from the three pictograms 220a, 220b, 220c.

The user may choose or skip a scenario employing various mechanisms, as explained elsewhere herein. In FIG. 2, skipping may be accomplished via a commonly accepted rejection gesture 230—shaking the smartphone 110 from side to side. When a scenario is skipped, the system may immediately display to the user a next scenario. If a user has not rejected a scenario within a predefined (or user defined) amount of time, the system may accept the scenario by a timeout, as illustrated by an item 240, where the user skips the first two scenarios 210a, 210b and accepts the scenario 210c after looking at the pictogram 220c that corresponds to the scenario 210c. In a different embodiment, the user may further move the camera to point directly at a chosen object or a couple of adjacent objects by zooming the objects in the camera view and putting other objects out of the view.

Once a scenario is accepted, the system may take a static photograph of the chosen object or crop the object from the scene, as shown by a snapshot 250.

Figure 3:
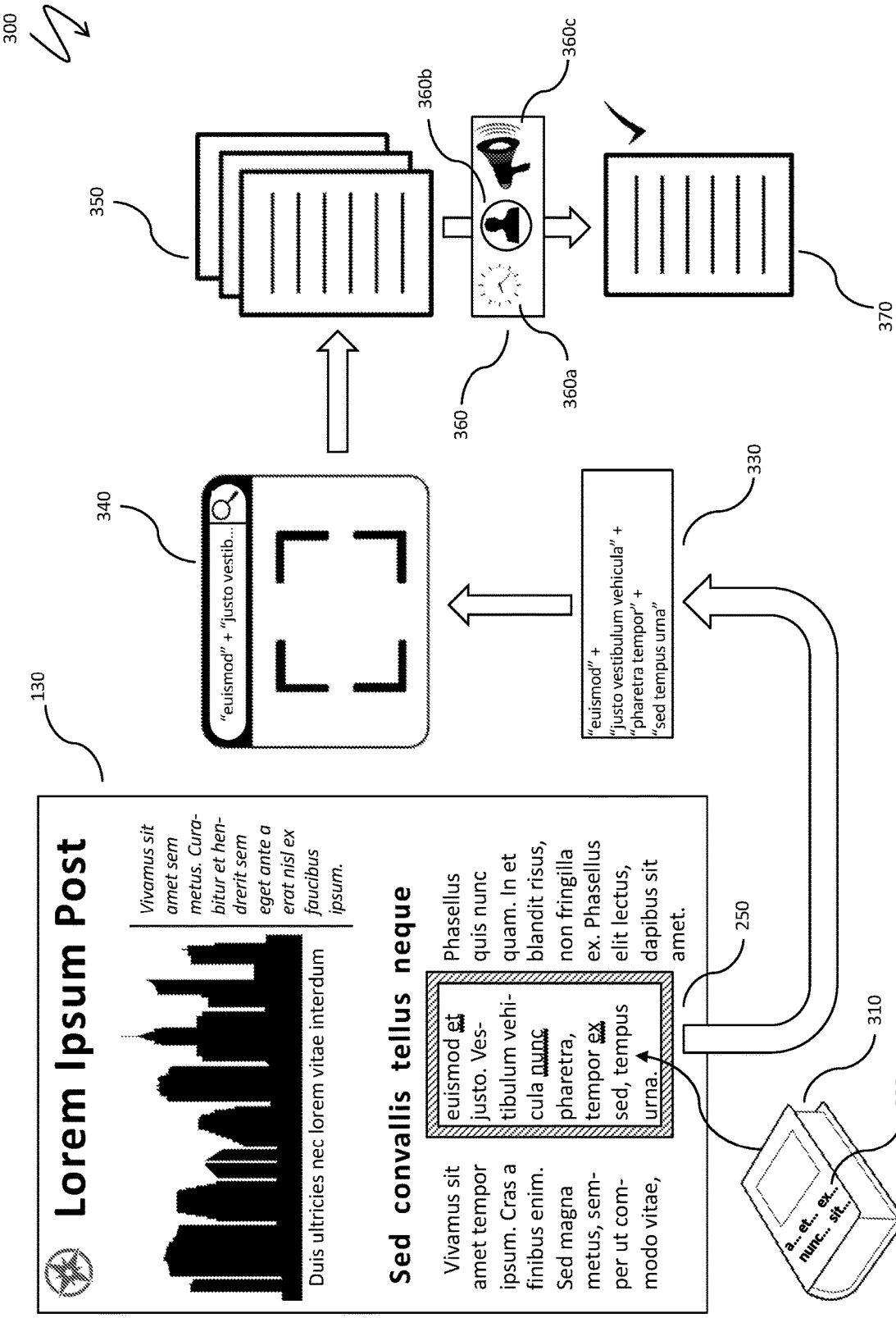
FIG. 3 schematically illustrates identifying a full online source for a selected object, according to an embodiment of the system described herein.

FIG. 3 is a schematic illustration 300 of identifying a full online source for a selected object. A chosen object corresponding to the snapshot 250 from the printed media page 130 is processed; text within the object is identified and recognized using OCR and/or other text recognition methods, as explained elsewhere herein. Under an assumption that the object includes a sufficient volume of text, the next step marks and omits stop words in the text associated with the object using a vocabulary of stop words 310. Several vocabulary entries 320 are shown for illustrative purpose and are underlined in the object text.

At a next step, the system builds a search query 330, which may include all fragments between the omitted stop words with the requirement of exact match for each of the fragments. The query 330 may be submitted to a general purpose or specialized, public or other search engine 340. The set of search results 350 (FIG. 3 illustrated the previously explained scenario (ii) with multiple search results) may be further prioritized using multi-criteria rankings based on a set of criteria 360, which may include a publication time 360a, author (writer) credentials 360b, distribution chain 360c, etc. Ranked sources may lead to a unique choice or may be presented to user for a final selection; a reference to an online source 370, such as a web address of the online source 370, may be stored together with the object for future access as needed.

Figure 4:
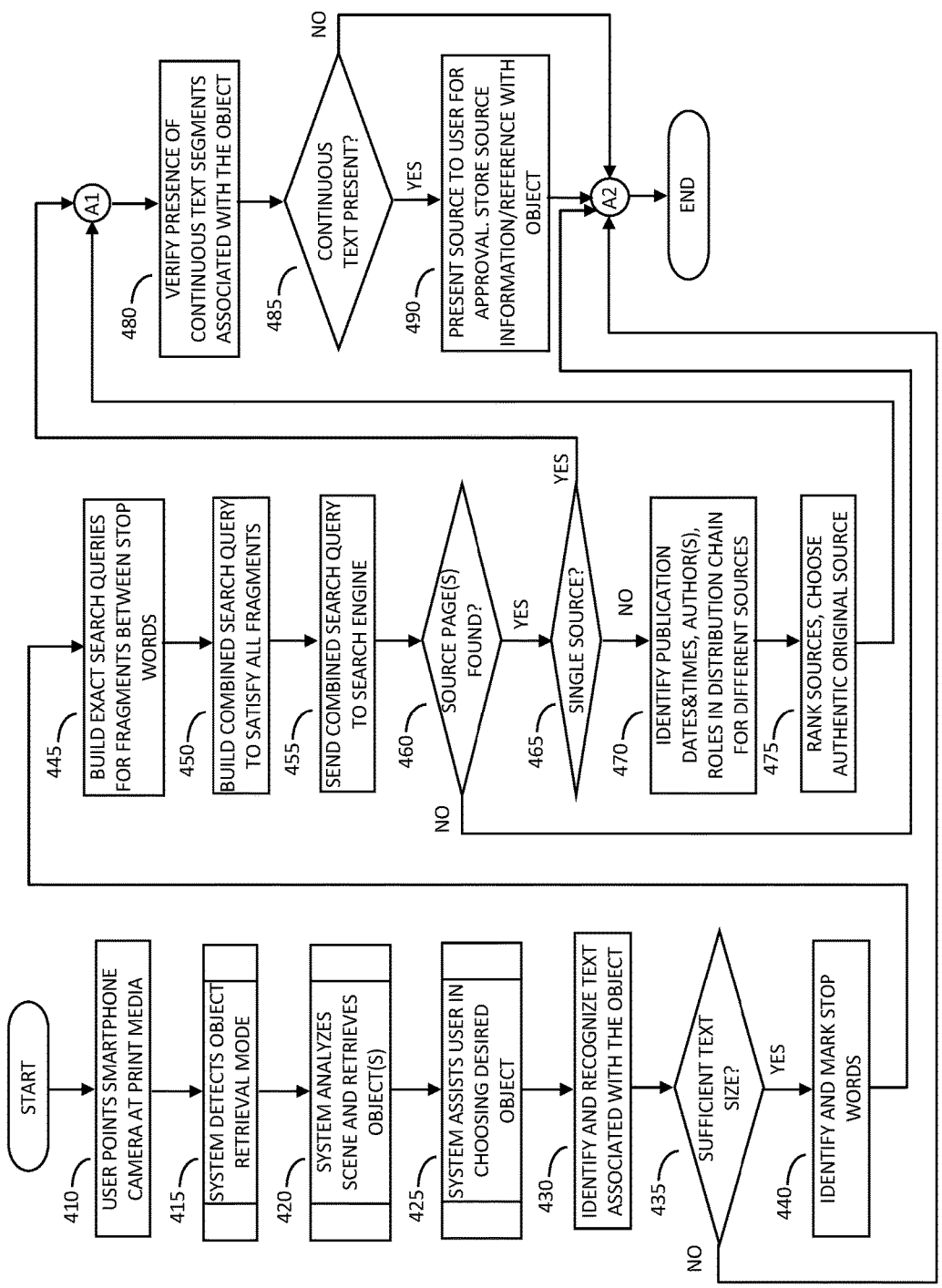
FIG. 4 is a system flow diagram illustrating processing in connection with identifying objects from photographs of printed documents and locating online copies thereof, according to an embodiment of the system described herein.

Referring to FIG. 4, a system flow diagram 400 illustrates processing in connection with identifying objects from photographs of printed documents and locating full online copies of the documents. Processing begins at a step 410, where a user points smartphone camera at a document, such as print media illustrated in FIGS. 1-3. After the step 410, processing proceeds to a step 415, where the system detects an object retrieval mode (as opposed to pre-positioning mode), as explained elsewhere herein; see, for example, FIG. 1 and the accompanying text. After the step 415, processing proceeds to a step 420, where the system analyzes the scene in video flow of the camera and retrieves one or multiple objects from the scene. After the step 420, processing proceeds to a step 425, where the system assists the user in choosing a desired object (or a set of objects), as explained elsewhere herein, including FIG. 2 and the related text.

After the step 425, processing proceeds to a step 430, where the system identifies and recognizes text associated with the chosen object. After the step 430, processing proceeds to a test step 435, where it is determined whether the text size is sufficient. If not, processing is complete; otherwise, processing proceeds to a step 440 where the system identifies and marks stop words using a dedicated vocabulary, as explained elsewhere herein, in particular, in conjunction with FIG. 3. After the step 440, processing proceeds to a step 445, where exact search subqueries are built for fragments of the associated object text between the stop word marks (stops words are omitted). After the step 445, processing proceeds to a step 450, where the subqueries are combined into a master search query which requires the search system to satisfy each of the subqueries.

After the step 450, processing proceeds to a step 455, where the combined master search query is sent to a search engine, as explained elsewhere herein. After the step 455 processing proceeds to a test step 460, where it is determined whether any source pages satisfy the search query. If not, processing is complete; otherwise, processing proceeds to a test step 465, where it is determined whether the source page is unique. If not, processing proceeds to a step 470, where the system identifies criteria used to rank multiple source pages, such as publication dates and times, authors, roles of source pages in the content distribution chain, etc., as explained elsewhere herein, including FIG. 3 and the accompanying text.

After the step 470, processing proceeds to a step 475 where the system ranks sources according to the criteria and chooses an authentic original source, possibly with approval of the user. After the step 475, processing proceeds to a step 480, where the system verifies the presence of the contiguous text associated with the chosen object within the identified source. The step 480 may be independently reached from the test step 465 if the search returned a single source. After the step 480, processing proceeds to a test step 485, where it is determined whether the contiguous text associated with the object is present in the identified source. If so, processing proceeds to a step 490 where the system presents the source to user for a final approval and stores information about the source (such as a web address and/or or a full text) with the chosen object; otherwise, processing is complete. After the step 490, processing is complete.

Figure 5:
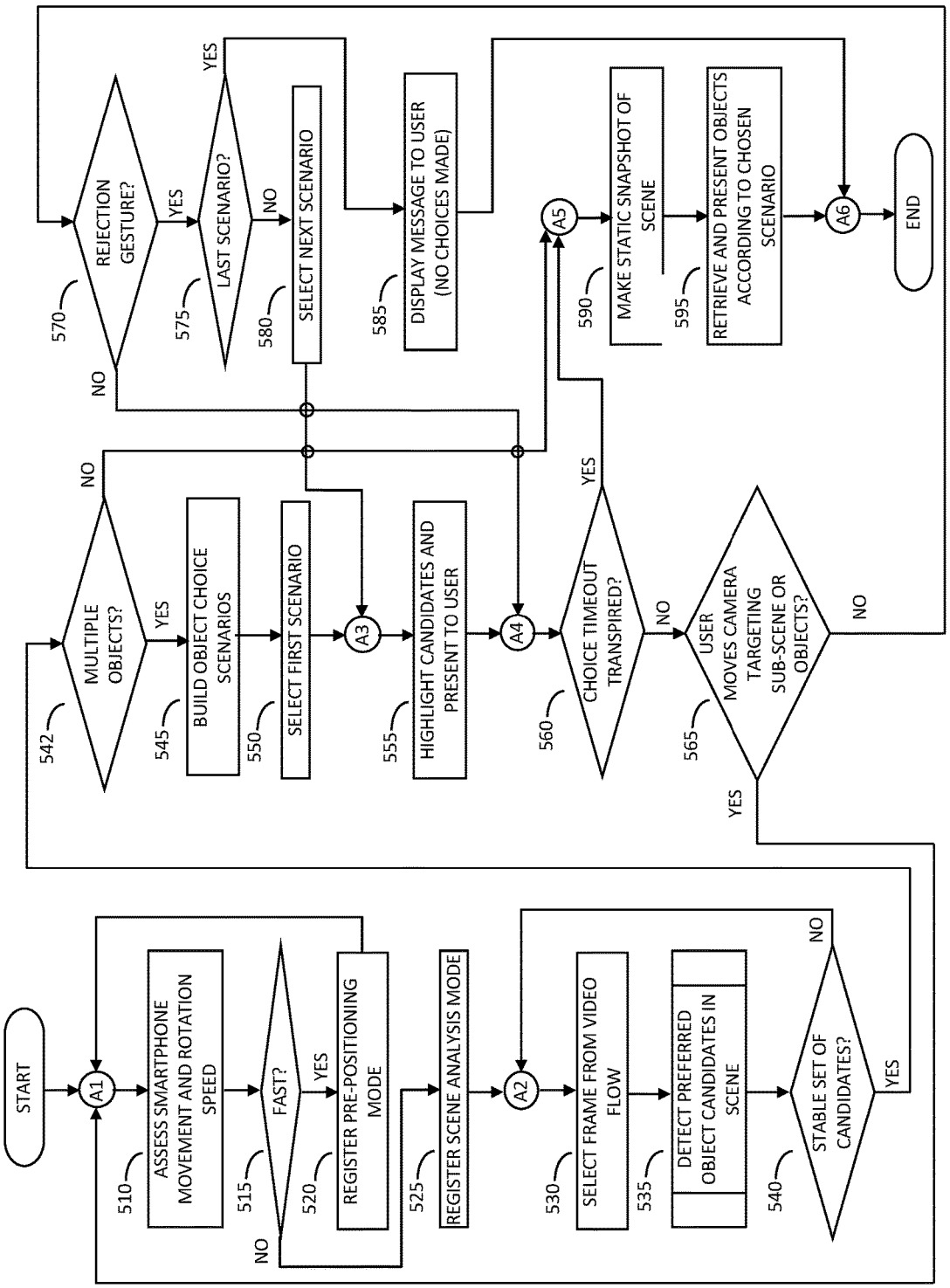
FIG. 5 is a system flow diagram illustrating object retrieval, according to an embodiment of the system described herein.

Referring to FIG. 5, a system flow diagram 500 illustrates processing in connection with object retrieval. Processing begins at a step 510, where the system assesses smartphone movement and rotation speed based on indications of smartphone sensors and possibly a frequency of content changes in the video flow of a preview mode. After the step 510, processing proceeds to a test step 515, where it is determined whether changes are occurring rapidly. If so, processing proceeds to a step 520, where the system registers pre-positioning mode. After the step 520, processing returns back to the step 510. If it was determined at the test step 515 that changes are not occurring rapidly, processing proceeds to a step 525, where the system registers a scene analysis mode.

After the step 525, processing proceeds to a step 530, where the system selects a frame from the preview video flow. After the step 530, processing proceeds to a step 535, where the selected frame is analyzed and preferred object candidates in the scene are detected. After the step 535, processing proceeds to a test step 540, where it is determined whether the set of preferred object candidates is stable from frame to frame of the video flow. If not, processing proceeds back to the step 530 to continue frame selection until the set of candidates stabilizes. Otherwise, processing proceeds to a test step 542 where it is determined whether the stable set of candidates includes multiple objects. If so, processing proceeds to a step 545 where the system builds object choice scenarios, as explained elsewhere herein (see, in particular, FIG. 2 and the accompanying text). After the step 545, processing proceeds to a step 550, where the first scenario is selected. After the step 550, processing proceeds to a step 555, where the system highlights object candidates included in the scenario and presents the scenario to the user (see, for example, pictograms in FIG. 2, explained in the accompanying text). After the step 555, processing proceeds to a test step 560, where it is determined whether the choice timeout established for acceptance of a scenario has transpired. If not, processing proceeds to a test step 565, where it is determined whether the user moves the smartphone with the camera, targeting a sub-scene or object in the scene. If so, processing proceeds back to the step 510 to reset scene analysis; otherwise, processing proceeds to a test step 570, where it is determined whether the user has made a rejection gesture. If not, processing proceeds back to the test step 560; otherwise, processing proceeds to a test step 575, where it is determined whether the system is displaying the last object choice scenario. If so, processing proceeds to a step 585, where the system displays a message to the user that no object choices have been made. After the step 585, processing is complete. If it was determined at the test step 575 that the current object choice scenario is not the last scenario, processing proceeds to a step 580, where the system selects the next object choice scenario. After the step 580, processing proceeds back to the step 555.

If it has been determined at the test step 542 that the set of candidates contains a single object or if it has been determined at the test step 560 that the choice timeout has transpired, processing proceeds to a step 590 where the system makes a static snapshot of the scene (this step may be optional and may depend, for example, on a difference in image resolution of a static snapshot and a preview frame). After the step 590, processing proceeds to a step 595, where the system retrieves and presents objects according to the chosen scenario. After the step 595, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. Smartphones functioning as object capturing devices may include software that is pre-loaded with the device, installed from an app store, installed from a desktop (after possibly being pre-loaded thereon), installed from media such as a CD, DVD, etc., and/or downloaded from a Web site. Such smartphones may use operating system(s) selected from the group consisting of: iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of searching for documents, comprising:
    capturing, by a camera of a device, one or more images of media content;
    identifying, within the one or more images of the media content, a plurality of objects;
    simultaneously displaying, by a display of the device, a plurality of subsets of the plurality of objects, wherein:
        the plurality of subsets of the plurality of objects includes a first subset of the plurality of objects and a second subset of the plurality of objects, and
        the first subset of the plurality of objects is distinct from the second subset of the plurality of objects;
    enabling the user to select a respective subset of the plurality of subsets of the plurality of objects;
    detecting a selection of the respective subset of the plurality of subsets of the plurality of objects;
    retrieving the selected respective subset of the plurality of objects from the plurality of subsets of the plurality of objects;
    forming a search query based on text of the selected respective subset of the plurality of objects;
    performing a search using the search query;
    determining one or more source documents that include the text of the selected respective subset of the plurality of objects retrieved from the plurality of subsets of the plurality of objects;
    displaying one or more source documents;
    detecting input to select a respective source document of the one or more source documents; and
    storing the selected respective subset of the plurality of objects retrieved from the plurality of subsets of the plurality of objects with information that corresponds to the selected respective source document.

2. The method of claim 1, further comprising delaying the capturing of the one or more images of media content for a period of time that corresponds to a camera stabilization operation.

3. The method of claim 2, wherein performing the camera stabilization operation includes at least one of: detecting changing content of video captured by the camera and using one or more motion sensors of the camera to detect movement.

4. The method of claim 1, wherein detecting the selection of the respective subset of the plurality of subsets of the plurality of objects includes detecting, by the device, a user input gesture that corresponds to the respective subset during presentation thereof.

5. The method of claim 1, further comprising:
    removing one or more stopwords from the text of the selected respective subset of the plurality of objects.

6. The method of claim 1, wherein performing the search using the search query produces a plurality of search results that are prioritized based on at least one of: publication time, author credentials, or distribution chain.

7. The method of claim 1, wherein:
    displaying the plurality of subsets of the plurality of objects includes displaying a plurality of pictograms;
    a respective pictogram of the plurality of pictograms includes a representation of a first respective object of the plurality of objects and a representation of a second respective object of the plurality of objects; and the first respective object is visually emphasized relative to the second respective object.

8. The method of claim 1, wherein the plurality of objects include at least one of a column, a header, a text block, a drawing, a chart, a building, or a person.

9. The method of claim 1, wherein:
the plurality of objects include a plurality of column objects, wherein a respective column object of the plurality of column objects includes at least a portion of a column of the media content;
the first subset of the plurality of objects includes a first plurality of column objects from the plurality of objects; and
the second subset of the plurality of objects includes a second plurality of column objects from the plurality of objects, wherein the second plurality of column objects is distinct from the first plurality of column objects.

10. The method of claim 1, wherein the one or more source documents include a full online version of the one or more source documents restored using the selected respective subset of the plurality of objects.

11. The method of claim 1, wherein the search query includes merged subqueries of one or more fragments of text of the selected respective subset of the plurality of objects.

12. A non-transitory computer readable medium storing one or more programs, the one or more programs comprising instructions, which when executed by a device with a camera, cause the device to:
capture, by the camera, one or more images of media content;
identify, within the one or more images of the media content, a plurality of objects;
simultaneously display, by a display of the device, a plurality of subsets of the plurality of objects, wherein:
the plurality of subsets of the plurality of objects includes a first subset of the plurality of objects and a second subset of the plurality of objects, and
the first subset of the plurality of objects is distinct from the second subset of the plurality of objects;
enable the user to select a respective subset of the plurality of subsets of the plurality of objects;
detect a selection of the respective subset of the plurality of subsets of the plurality of objects;
retrieve the selected respective subset of the plurality of objects from the plurality of subsets of the plurality of objects;
form a search query based on text of the selected respective subset of the plurality of objects;
determine one or more source documents that include the text of the selected respective subset of the plurality of objects retrieved from the plurality of subsets of the plurality of objects;
display one or more source documents;
detect input to select a respective source document of the one or more source documents;
perform a search using the search query; and
store the selected respective subset of the plurality of objects retrieved from the plurality of subsets of the plurality of objects with information that corresponds to the selected respective source document.

13. The non-transitory computer readable medium of claim 12, wherein the one or more programs include instructions that cause the device to delay capture of the one or more images of media content for a period of time that corresponds to a camera stabilization operation.

14. The non-transitory computer readable medium of claim 13, wherein performing the camera stabilization operation includes at least one of: detecting changing content of video captured by the camera and using one or more motion sensors of the camera to detect movement.

15. The non-transitory computer readable medium of claim 12, wherein detecting the selection of the respective subset of the plurality of subsets of the plurality of objects includes detecting, by the device, a user input gesture that corresponds to the respective subset during presentation thereof.

16. The non-transitory computer readable medium of claim 12, the one or more programs further comprising instructions that cause the device to:
remove one or more stopwords from the text identified in the selected respective subset of the plurality of objects.

17. The non-transitory computer readable medium of claim 12, wherein performing the search using the search query produces a plurality of search results that are prioritized based on at least one of: publication time, author credentials, or distribution chain.

18. The non-transitory computer readable medium of claim 12, wherein:
displaying the plurality of subsets of the plurality of objects includes displaying a plurality of pictograms;
a respective pictogram of the plurality of pictograms includes a representation of a first respective object of the plurality of objects and a representation of a second respective object of the plurality of objects; and
the first respective object is visually emphasized relative to the second respective object.

19. The non-transitory computer readable medium of claim 12, wherein the plurality of objects include at least one of a column, a header, a text block, a drawing, a chart, a building, or a person.

20. The non-transitory computer readable medium of claim 12, wherein:
the plurality of objects include a plurality of column objects, wherein a respective column object of the plurality of column objects includes at least a portion of a column of the media content;
the first subset of the plurality of objects includes a first plurality of column objects from the plurality of objects; and
the second subset of the plurality of objects includes a second plurality of column objects from the plurality of objects, wherein the second plurality of column objects is distinct from the first plurality of column objects.

* * * * *